(12) United States Patent
Baasch Sørensen et al.

(10) Patent No.: US 11,054,150 B2
(45) Date of Patent: Jul. 6, 2021

(54) DIAGNOSTIC METHOD FOR DIAGNOSING THE CORRECT OPERATION OF A HEATING AND/OR COOLING SYSTEM

(71) Applicant: GRUNDFOS HOLDING A/S, Bjerringbro (DK)

(72) Inventors: Erik Baasch Sørensen, Bjerringbro (DK); Martin Clausen, Bjerringbro (DK)

(73) Assignee: GRUNDFOS HOLDING A/S, Bjerringbro (DK)

(*) Notice: Subject to any disclaimer, the term of this patent is extended or adjusted under 35 U.S.C. 154(b) by 294 days.

(21) Appl. No.: 15/034,672

(22) PCT Filed: Oct. 13, 2014

(86) PCT No.: PCT/EP2014/071923
§ 371 (c)(1),
(2) Date: May 5, 2016

(87) PCT Pub. No.: WO2015/067439
PCT Pub. Date: May 14, 2015

(65) Prior Publication Data
US 2016/0273787 A1 Sep. 22, 2016

(30) Foreign Application Priority Data
Nov. 7, 2013 (EP) .................................... 13192029

(51) Int. Cl.
*F24D 19/10* (2006.01)
*G05B 9/02* (2006.01)
(Continued)

(52) U.S. Cl.
CPC ........... *F24D 19/1015* (2013.01); *F24D 3/02* (2013.01); *F24D 19/1036* (2013.01); *G01F 1/34* (2013.01); *G05B 9/02* (2013.01)

(58) Field of Classification Search
CPC ..... G05B 9/02; G01F 1/34; G01F 1/36; G01F 5/005; F24D 19/1036; F24D 19/1015; F24D 3/02; F24D 19/0075
(Continued)

(56) References Cited

U.S. PATENT DOCUMENTS 634,570 A * 10/1899 Briggs ............................ 237/69
5,190,068 A * 3/1993 Philbin ................. G01F 15/024
137/486

(Continued)

FOREIGN PATENT DOCUMENTS

CN 101140294 A 3/2008
CN 101876285 A 11/2010
(Continued)

*Primary Examiner* — Kenneth J Hansen
*Assistant Examiner* — John E Bargero
(74) *Attorney, Agent, or Firm* — McGlew and Tuttle. P.C.

(57) ABSTRACT

A diagnosis method for the diagnosis of the correct function of a heating and/or cooling system with at least one load circuit (6), through which a fluid flows as a heat transfer medium. For the diagnosis an opening degree ($V_{pos,n}$) of the load circuit (6) is changed for changing the flow. Subsequently a differential pressure ($H_{pu}$) across the load circuit (6) and/or a volume flow of a fluid flowing through the load circuit (6) is detected and the detected values, or at least a value derived from the detected values, are/is compared to at least one predefined system limit value.

20 Claims, 5 Drawing Sheets

(51) Int. Cl.
*F24D 3/02* (2006.01)
*G01F 1/34* (2006.01)

(58) Field of Classification Search
USPC .......................................................... 237/8 A
See application file for complete search history.

(56) References Cited

U.S. PATENT DOCUMENTS

| | | |
|---|---|---|
| 2005/0072214 A1* | 4/2005 | Cooper ............... G01M 3/2815 73/40.5 R |
| 2008/0077335 A1 | 3/2008 | Lee et al. |
| 2010/0305828 A1 | 12/2010 | Kuentzle et al. |
| 2011/0297364 A1 | 12/2011 | Loeffler |
| 2014/0150883 A1 | 6/2014 | Lederle et al. |

FOREIGN PATENT DOCUMENTS

| | | |
|---|---|---|
| CN | 103151618 A | 6/2013 |
| CN | 103221750 A | 7/2013 |
| CN | 103842732 A | 6/2014 |
| DE | 10 2007 036057 A1 | 3/2008 |
| DE | 10 2009 002746 A1 | 11/2010 |
| EP | 0795724 B1 | 9/2001 |
| EP | 2607801 A1 | 6/2013 |
| RU | 2279609 C2 | 7/2006 |
| SU | 1379674 A1 | 3/1988 |
| WO | 2013/053574 A2 | 4/2013 |

\* cited by examiner

DIAGNOSTIC METHOD FOR DIAGNOSING THE CORRECT OPERATION OF A HEATING AND/OR COOLING SYSTEM

CROSS REFERENCE TO RELATED APPLICATIONS

This application is a United States National Phase Application of International Application PCT/EP2014/071923 filed Oct. 13, 2014 and claims the benefit of priority under 35 U.S.C. § 119 of European Patent Application 13192029.0 filed Nov. 7, 2013 the entire contents of which are incorporated herein by reference.

FIELD OF THE INVENTION

The invention relates to a diagnosis method for the diagnosis of the correct function of a heating system and/or cooling system with at least one load circuit, through which a fluid flows as a heat transfer medium, as well as to a manifold device for a heating and/or cooling system which permits the application of such a diagnosis method.

BACKGROUND OF THE INVENTION

Heating and/or cooling systems for the temperature regulation of buildings or rooms are known, which comprise at least one load circuit, through which a fluid, for example water flows as a heat transfer medium. This heat transfer medium transports water from a heat source into a room to be heated or delivers the water from a cold source into a room to be cooled. For example, the load circuit can be designed as a floor heating circuit. In the case that several heat load circuits are present, it is usual to connect these to a manifold. Possibilities for errors are always present with the installation or fitting, and these errors could later compromise the correct functioning of the system.

SUMMARY OF THE INVENTION

With regard to these problems, it is an object of the invention to provide a diagnosis method which permits an inspection of the correct function of a heating and/or cooling system.

The diagnosis method according to the invention is envisaged for the diagnosis of the correct function of a heating and/or cooling system, which comprises at least one load circuit, through which a fluid, for example water flows as a heat transfer medium. Thereby, the fluid for example flows from a heat source or cold source through the load circuit into a room thermally regulated. The load circuit thereby can be applied into the floor of the room or be led through other suitable heat exchangers, for example radiators.

The aim of the diagnosis method according to the invention is to ascertain whether a load circuit is correctly connected and fluid flows through it. For this, for the diagnosis one envisages enlarging the opening degree of the at least one load circuit, i.e. the opening degree of a regulating element in the load circuit, so that the flow through this load circuit to be examined is increased or should increase with a correct functioning.

Preferably, the opening degree of the at least one regulating element is changed in a manner such that the opening degree is increased. By way of this the flow is increased by the load circuit to be examined or the flow should increase with a correct functioning of the load circuit. Alternatively it is also possible to change the opening degree in a way such that the opening degree is reduced for reducing the flow. The flow would thereby reduce in a predefined value with a correct functioning of the load circuit.

After increasing the opening degree, a differential pressure across the load circuit and/or a volume flow of a fluid flowing through the load circuit is/are detected, and the thus detected values or at least a value derived from these are/is compared to at least one predefined system limit value. The flow and the differential pressure can preferably very easily be detected or determined by a circulation pump which delivers the fluid through the load circuit. Suitable pressure sensors can be present for detecting the pressure. Alternatively and preferably, the differential pressure can be determined from operating parameters of the circulation pump, specifically for example from the rotational speed and the taken-up electrical power. The differential pressure across the circulation pump thereby corresponds to the differential pressure between the entry and exit of the at least one load circuit. In particular, a change of the differential pressure or of the volume flow or of a value derived from these can be considered for the diagnosis with the change of the opening degree. A derived value is preferably the hydraulic resistance which is determined from the detected volume flow and the differential pressure.

With a correct function of the heating and/or cooling system, the values for the differential pressure and/or the volume flow and in particular for the hydraulic resistance lie within limits specified for the installation. One can conclude a malfunctioning if these values become larger or smaller than these limits. If for example the hydraulic resistance is too high, then this indicates that the flow through the load circuit is blocked in some sort of manner. If no flow occurs, this indicates that the load circuit is completely blocked, or, as the case may be, is incorrectly connected to a manifold, so that a flow is not possible at all. Moreover, the correct function of a regulating element changing the opening degree of the load circuit, e.g. of a valve, can be examined from the detected changes of flow and/or differential pressure. According to the invention, an error notice can be issued given respective deviations from the system limit value or values, and this notice can initiate the user or the installer to carry out an inspection or examination of the heating and/or cooling system.

As described above, the opening degree of the at least one load circuit is increased for diagnosis. This can be an increase starting from a completely closed condition of the load circuit. Preferably however, the opening degree is varied between a basis value and a higher value, since this permits a better diagnosis. If the opening degree is changed by reducing the opening degree, the regulating valve can for example be completely closed. Preferably however also thereby the opening degree is varied between a basis value and a lower value, at which value the regulating valve is not completely closed.

In the case that several load circuits are present, the individual load circuits are successively tested for their diagnosis. It is always the opening degree of one load circuit in each case which is increased for this. The remaining load circuits remain at their initial opening degree. This is effected successively for several, preferably for all load circuits. Thus, in each case, the opening degree of one of the load circuits is increased, whilst simultaneously the opening degree of the other load circuits remains unchanged and subsequently the differential pressure and/or the volume flow of the fluid flowing through the load circuit with the increased opening degree is detected, and the detected values or at least a value derived from these is compared to at least one defined system limit value. Preferably, the differential pressure and the volume flow are always simultaneously detected for all load circuits. Preferably, the differential pressure and/or the volume flow through a circulation pump assembly which delivers the fluid through the load circuit, preferably through several load circuits is/are detected. If all load circuits are supplied with fluid by way of a common circulation pump, the differential pressure across the load circuits is equal to the differential pressure across the pump and can be detected via this pump. The load circuits which are not examined at this moment can either be completely closed or remain at their opening degree set previously in operation. A comparison with predefined system limit values is possible despite this. If a load circuit is additionally opened, preferably completely opened, the complete hydraulic resistance for example may not exceed a certain limit value.

In the case that a hydraulic resistance is determined from the detected differential pressure and the detected flow, this hydraulic resistance is preferably compared to a predefined system limit value or a predefined expected change of the hydraulic resistance, in the manner described above. If the hydraulic resistance lies for example above a predefined setpoint or limit value of the system, this for example indicates a blockage in the respective load circuit or an incorrect connection of the load circuit to a manifold. Particularly preferably, the hydraulic resistance is compared to a minimal and/or a maximal system value. Thus, even in the case that the hydraulic resistance is too low, one can conclude a malfunction.

As described, an error notice is preferably produced on exceeding a maximal system limit value and/or on falling short of a minimal system limit value, and this notice indicates to the user or to the person setting up the system that a malfunction necessitating an inspection of the installation or of the system is present.

A manifold device for a heating and/or cooling system with at least one load circuit is also the subject matter of the invention, apart from the previously described diagnosis method. The manifold device comprises a control device which is designed such that it carries out the previously described diagnosis method. The manifold device according to the invention comprises at least one circulation pump assembly or a circulation pump for delivering a fluid through the at least one load circuit, preferably through several parallel load circuits. Moreover, the manifold device comprises at least one regulating element for setting the volume flow through the load circuit. The volume flow can be changed, in particular proportionally changed by the regulating element. A regulating element is provided for each load circuit in the case that several load circuits are present. Moreover, the manifold device comprises a control device which is connected to the at least one regulating element, for example to a regulating valve, for the actuation of this regulating element. I.e. the control device can open and close the regulating element and in particular change the opening degree, in order to influence the volume flow. Moreover, the control device is connected to detecting means for detecting the volume flow through the at least one load circuit or several load circuits and/or the differential pressure across the load circuit. The control device is designed such that it can carry out the diagnosis method described above. For this, the control device in particular is designed in a manner such that for the diagnosis of a load circuit, it opens its regulating element further or closes it, in order to increase or reduce the flow, and subsequently the volume flow and/or the differential pressure or the change of these values across the load circuit in the complete system is detected via the detecting means and compared to given system limit values or at least to a predefined system limit value. For this, the control device can be designed such that it determines a derived value from the detected values, for example the hydraulic resistance and compares this to a predefined system limit value which is stored in the control device.

Particularly preferably, the manifold device comprises several regulating elements which are provided in each case for setting a volume flow in one of several load circuits, wherein the control device is designed for activating the several regulating elements and is signal-connected to the regulating elements for their activation. This permits the control device to open or close the individual regulating elements in a targeted manner or to increase or to reduce the opening degree of the individual regulating elements in a targeted manner and simultaneously to close the other regulating elements or leave them unchanged, in order to successively examine individual load circuits in the described manner. For example, the regulating elements are designed as motorically driven regulating valves which are electrically connected to the control device for their activation.

The circulation pump assembly is preferably situated in a common feed conduit to several, in particular all load circuits. Thus, the circulation pump assembly serves for delivering fluid through the several or all load circuits.

Particularly preferably, the circulation pump assembly itself serves as detecting means, wherein the circulation pump assembly is designed in a manner such that it determines the differential pressure across the circulation pump assembly and/or the volume flow. The circulation pump assembly is signal-connected to the control device for transmitting the determined values. Particularly preferably, the control device is integrated into the circulation pump assembly, i.e. into an electronics housing arranged on the circulation pump assembly. The control device particularly preferably simultaneously serves for the control or regulation of the circulation pump assembly, in particular for speed control. The differential pressure across the circulation pump can for example be determined from the speed and from the electric power uptake of the circulation pump assembly. The volume flow can also be derived from these operating parameters or be detected via a separate flow sensor in the circulation pump assembly or at another location in the installation.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
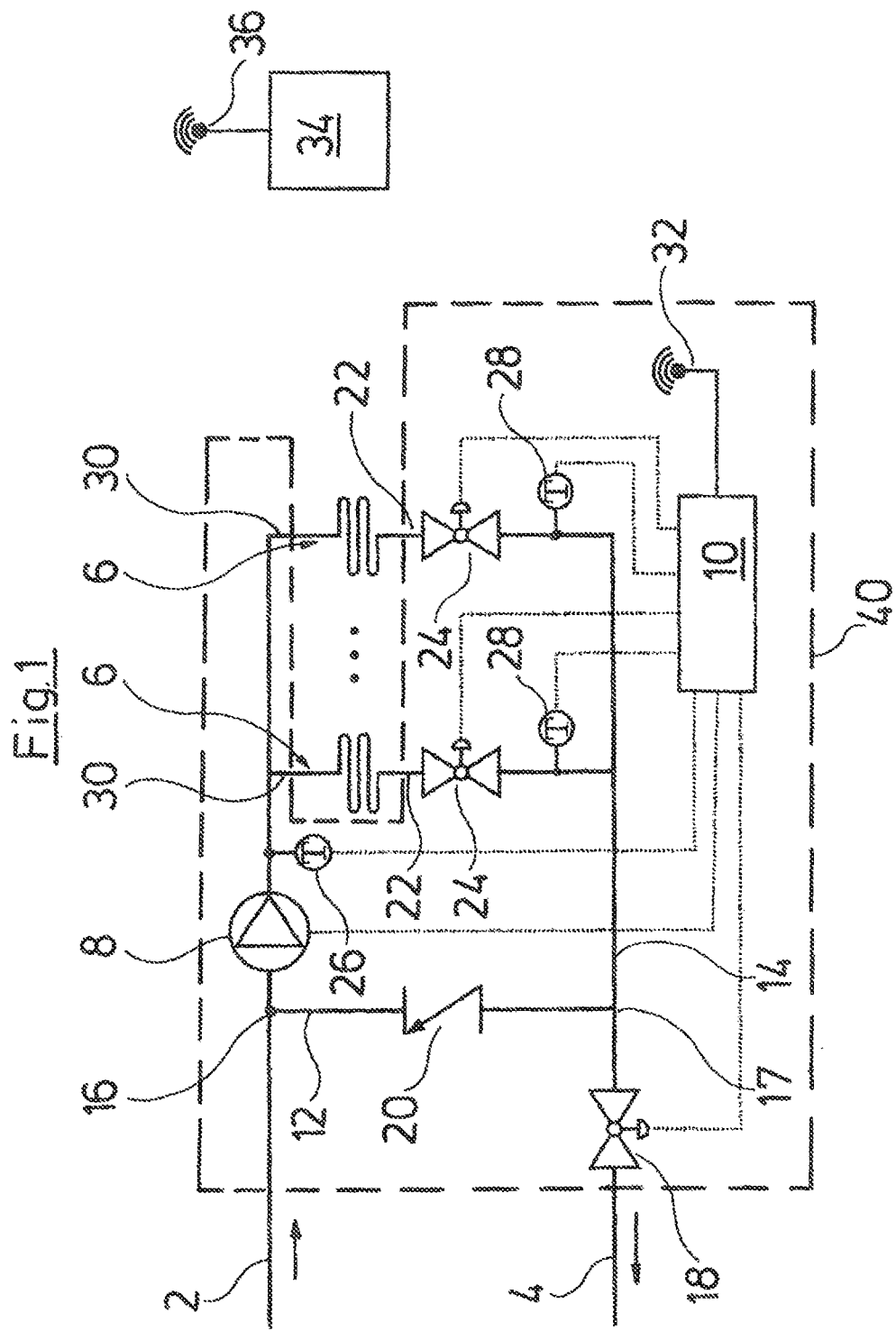
FIG. 1 is a schematic view showing a heating or cooling system, in which the regulating method according to the invention as well as the manifold device according to the invention are applied.

FIG. 1 shows a heating or cooling system which can be designed for example as a floor heating system. Hereinafter, the invention is described with the example of a heating system. However, it is to be understood that the invention could also be correspondingly realized as a cooling system. Alternatively, the system can also be applied as a heating as well as for cooling, i.e. for example in winter as a heater and as a cooling system in summer.

The heating system shown in FIG. 1 comprises an inlet 2 and an outlet 4 which are provided for connection to a supply, i.e. for example to a boiler, to a heat reservoir or to a cooling installation etc. Moreover, several load circuits 6 are provided, which for example represent individual floor heating circuits which in each case heat a part region such as a room of a building. A circulation pump or a circulation pump assembly 8 is arranged at the entry side, i.e. upstream of the load circuits 6. This pump or pump assembly comprises a speed-regulated drive motor and is connected to a control device 10 for the activation and in particular for setting the speed. The entry side of the circulation pump assembly 8 is connected to the inlet 2.

Moreover, a mixing device is arranged upstream of the circulation pump assembly 8. The mixing device comprises a mixing conduit 12 which connects a return 14 from the load circuits 6 to a mixing point 16 in the flow path from the inlet 2 to the circulation pump 8. I.e. fluid from the inlet 2 is mixed with fluid from the return 14, at the mixing point 16, in order to be able to set the feed temperature. A regulating valve which forms a mixing valve 18 is arranged in the return 14, downstream of the branching 17 of the mixing conduit 12 in the return 14, for the regulation of the mixing ratio. This is likewise signal-connected to the control device 10 for its activation. Moreover, a check valve 20 is arranged in the mixing conduit 12 and prevents the backflow of fluid from the mixing point 16 into the return 14. The volume flow which flows out of the return 14 to the outlet 4 changes in a manner depending on the opening degree of the mixing valve 18. If the volume flow is reduced by way of a reduction of the opening degree of the mixing valve 18, a greater share of the fluid flows through the mixing conduit 12 to the mixing point 16. If the opening degree of the mixing valve 18 increases, the volume flow through the outlet 4 increases and accordingly a smaller share of the fluid flow flows from the return 14 through the mixing conduit 12 to the mixing point 16. Thus, the share of fluid from the return 14 and which is admixed at the mixing point 16 to the fluid out of the inlet 2 changes. The feed temperature of the fluid from the inlet 2 can be lowered by way of the mixing of the fluid from the return 14 and which is colder in the case of a heating system, with the warmer fluid from the inlet 2. In the case of a cooling system, vice versa warmer fluid from the return 14 is admixed to the colder fluid from the inlet 2, in order to increase the feed temperature. The circulation pump 8 delivers the fluid from the mixing point 16 to the load circuits 6 arranged in parallel.

In each case, a regulating valve 24 is arranged at the exits 22 of the load circuits, i.e. in their returns, and this valve is designed as an electromotorically driven regulating valve 24 and is activated by the control device 10. The regulating valves 24 can be varied in their opening degree and also be completely closed, in order to set the flow or volume flow through each individual load circuit 6. Thereby, the regulating valves 24 can be individually activated by the control device 10, so that an adaptation of the flow through each individual load circuit 6 is possible independently of the remaining load circuits.

Moreover, temperature sensors are provided in the shown system. A first temperature sensor is a feed temperature sensor 26 and detects the feed temperature of the fluid which is fed to the load circuits 6. Moreover, temperature sensors 28 are arranged at the exits 22 of the load circuits 6 and detect the exit temperatures of the fluid from the individual load circuits 6. The temperature values which are detected by the feed temperature sensor 26 and the temperature sensors 28 are led via suitable communication connections likewise to the control device 10.

The circulation pump assembly 8 is moreover designed to determine a differential pressure $H_{pu}$ between the entry side and the exit side of the circulation pump assembly 8 and which simultaneously corresponds to the differential pressure between the entries 30 and the mixing point 16, i.e. which corresponds to the pressure drop via each branches between these points which are defined by the load circuit 6. Moreover, the circulation pump assembly 8 is designed to determine the flow through the circulation pump assembly 8. These values detected by the circulation pump assembly 8 are likewise led via a signal connection to the central control device 10. Alternatively, suitable pressure sensors and flow sensors could be arranged additionally to the circulation pump assembly 8, in order to determine the pressure difference between the entry and exit of the load circuits 6 as well as the flow through all load circuits 6.

On basis of the differential pressure $H_{pu}$, i.e. the pressure drop via the load circuit can be used in regard to the characteristic of the valves lying in the flow path, particularly of the check valve 20 and the regulating valve 24, moreover, the volume flow through each load circuit 6 depending on the opening degree of the per-respective valve 24 can be determined. Since the controller 10 controls the opening degree of the regulating valves 24, the control device 10 can determine the flow rate or volume flow rate through the associated load circuit 6 from the said values.

Thus, as described below, a desired flow rate can be adjusted by the load circuit 6.

The control device 10 is moreover provided with a communication interface 32 which is designed to communicate with one or more room thermostats 34 or room temperature probes 34. Such a room thermostat 34 is preferably provided in each room which is to be thermally regulated by a load circuit 6. In the shown example, the communication interface 32 is designed as a radio interface which communicates with corresponding radio interface 36 of the room thermostat 34. Alternatively, a lead connection via a separate signal lead, a bus system or a powerline communication could be provided. The room thermostats 34 detect the room temperatures in the rooms to be thermally regulated. Moreover, a desired temperature for the room to be thermally regulated can be set by the user in each case in the known manner via the room thermostats 34.

The control device 10 is designed for the use of different regulating methods. Thus according to a first regulating method, the control device 10 effects a volume flow regulation for the individual load circuits 6. For this, the temperature difference $\Delta T$ between the entry 30 and the exit 22 of each load circuit 6 is detected. This is effected via the feed temperature sensor 26 as well as the temperature sensor 28 belonging to the respective load circuit 6. The volume flow is regulated or set by the control device 10 by changing the opening degree $V_{pos,n}$ of the regulating valve 24 in dependence on this temperature difference $\Delta T$, via the regulating valve 24 of this load circuit 6, so that the temperature difference $\Delta T$ corresponds to a predefined setpoint which is stored in the control device 10, i.e. that $\Delta T$ is kept constant. This is effected independently for each load circuit 6, so that all load circuits can be adapted by the volume flow regulation to the actual energy requirement. The setpoint can be the same for all load circuits 6 or different setpoints can be defined for individual load circuits. The setpoints are stored in the control device 10.

Thereby, the circulation pump assembly 8 is regulated by the control device 10 such that it maintains a predefined pressure difference setpoint between the entry and exit of the circulation pump assembly. This differential pressure is thus regulated to a pressure difference setpoint which is likewise set or defined by the control device 10. The pressure difference setpoint $H_{ref}$ is set by the control device 10 in dependence on the opening degree of the regulating valves 24. For this, all opening degrees of all regulating valves 24 are considered by the control device 10. That regulating valve which is presently open the furthest, i.e. has the greatest opening degree, then forms the basis of the setting of the pressure difference setpoint by the control device 10. Thus, the opening degree of the regulating valve which is open the furthest, is compared to a desired opening degree $V_{pos,ref}$. If the present or current opening degree $V_{pos,n}$ of the regulating valve 24 with the greatest opening degree exceeds the desired opening degree $V_{pos,ref}$, then the pressure difference setpoint $H_{ref}$ is increased. If the desired opening degree $V_{pos,ref}$ is fallen short of by the actual opening degree $V_{pos,n}$, then the pressure difference setpoint $H_{ref}$ is accordingly lowered. The increase or lowering is preferably effected proportionally to the deviation from the desired opening degree $V_{pos,ref}$.

Figure 4:
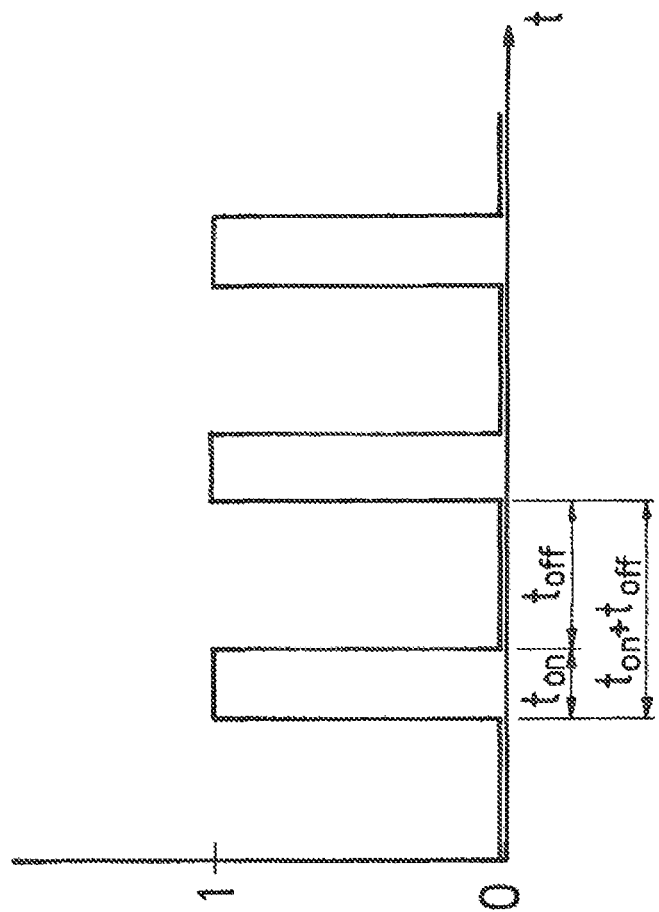
FIG. 4 is a graph showing the switch-on durations of a load circuit.
Figure 5:
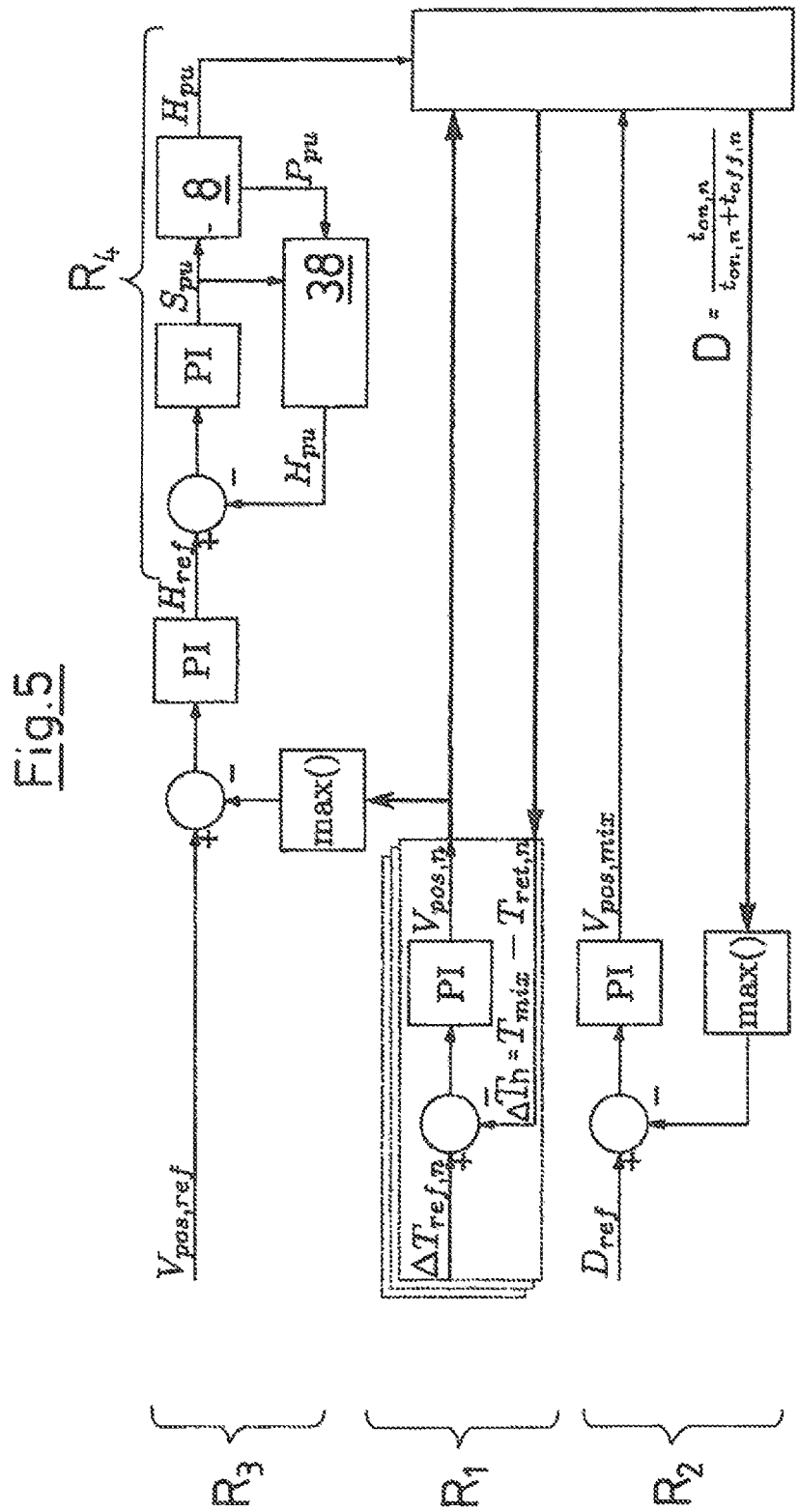
FIG. 5 is a schematic view showing the cooperation of individual parts of a regulating method according to the invention.

A further control loop or a further regulating method which is carried out by the control device 10 relates to the regulation of the feed temperature $T_{mix}$ at the entry 30 of the load circuits 6 and which is detected by the feed temperature sensor 26. The feed temperature $T_{mix}$ can be changed or set by the control device 10 by way of activation of the mixing valve 18. For this, the control device 10 forms a feed temperature setting device which sets the feed temperature $T_{mix}$, i.e. its setpoint in dependence on the switch-on duration, i.e. the relative switch-on duration D of the load circuits 6. The significance of the relative switch-on duration D is described in more detail by way of FIG. 4. FIG. 4 for a load circuit 4 shows how this is switched on and off in an alternating manner. "1" thereby means switched-on and "0" means switched-off. The load circuit is switched on for the time duration $t_{on}$, and the load circuit is switched off for the time duration $t_{off}$. The cycle time $t_z$ thereby corresponds to the sum of the switch-on time and switch-off time, i.e. $t_z = t_{on} + t_{off}$. The relative switch-on duration D is the ratio of the switch-on time $t_{on}$ to the cycle time $t_z$, as is represented in FIG. 5. The cycle time or cycle duration $t_z$ is thus the time interval between the switching-on of the load circuit 6 and the subsequent next switching-on of the load circuit 6. The switching-on and switching-off of the load circuit results from the signals of the associated room thermostats 34. If in the case of a heating system, the room thermostat 34 notes that a set desired temperature is fallen short off, the control device 10 switches on the load circuit 6 associated with the room, by way of opening the associated regulating valve 24. The volume flow regulation described above for the respective load circuit 6 is then effected. If the room thermostat 34 notes that the set temperature setpoint is reached, the control device 10 switches off the load circuit 6 belonging to the room, by way of completer closure of the regulating valve 24.

The feed temperature $T_{mix}$ and its setpoint is the same for all load circuits 6 and is set by the control device 10 in dependence on that load circuit 6 which has the longest relative switch-on duration D, i.e. the relatively largest load cycle. This is the load circuit 6 with the greatest thermal or cooling requirement, so that it is useful to adequately set the feed temperature $T_{mix}$ for this load circuit 6. The remaining load circuits 6 which have lower relative switch-on durations D accordingly have a lower energy requirement, so that the set feed temperature $T_{mix}$ for these load circuits is likewise sufficient. The setting of the feed temperature $T_{mix}$ is effected in a manner such that the relative switch-on duration D is compared to a limit value or a desired switch-on duration $D_{ref}$. If the relative switch-on duration D exceeds the desired switch-on duration $D_{ref}$, the feed temperature $T_{mix}$ respectively at first its setpoint is increased in the case of a heating, and the feed temperature $T_{mix}$ respectively its setpoint is reduced in the case of a cooling system. Vice versa, for the case that the relative switch-on duration D falls short of the desired switch-on duration $D_{ref}$, the feed temperature $T_{mix}$ respectively its setpoint is reduced in the case of a heating, and increased in the case of a cooling system. This is preferably effected proportionally to the deviation of the switch-on duration D from the desired switch-on duration $D_{ref}$. Alternatively, a change can also be effected in fixed steps. The desired switch-on duration $D_{ref}$ is stored as a preset value in the control device 10.

It is shown in FIG. 5 as to how the individual regulating methods or control loops cooperate. All the previously described control loops or regulating methods are preferably carried out continuously and simultaneously. The first control loops $R_1$ which are shown in FIG. 5 relate to the volume flow regulation for the individual load circuits 6. Thereby, a regulation for each load circuit 6 is effected independently, i.e. for each load circuit 6 the differential temperature $\Delta T_n$ ($\Delta T_n = T_{mix} - T_{ret,n}$, wherein $T_{ret,n}$ is the exit temperature of the respective load circuit which is detected by the associated temperature sensor 28) is compared to the temperature difference setpoint $\Delta T_{ref}$. The counter n in FIG. 5 indicates the respective load circuit 6. The temperature difference setpoint $\Delta T$ can also be differently defined for individually load circuits 6 and be stored in the control device 10. Alternatively, it is also possible to apply the same temperature different value $\Delta T_{ref}$ for all load circuits. However, it is always the actual exit temperature $T_{ref,n}$ of the respective load circuit which forms the basis of for the regulation, i.e. the exit temperature $T_{ref1}$ for the first load circuit 6, the exit temperature $T_{ref2}$ for the second load circuit, etc. The opening degree $V_{pos,n}$ for the associated regulating valve 24 is set by the control device 10 in dependence on the comparison of the differential temperature $\Delta T_n$ with the temperature difference setpoint $\Delta T_{ref}$.

A second control loop $R_2$ which is represented in FIG. 5, relates to the previously described setting of the feed temperature $T_{mix}$ by way of the control of the mixing valve 18. For this, a control variable $V_{pos,mix}$ which corresponds to the opening degree of the mixing valve 18, is set by the control device 10 by way of the relative switch-on duration D being compared to the desired switch-on duration $D_{ref}$ in the manner described above.

A third control loop $R_3$ and a fourth control loop $R_4$ which are shown in FIG. 5 and are implemented in the control device 10, relate to the differential pressure regulation in the circulation pump assembly 8. Thus, the differential pressure $H_{pu}$ between the entry and exit of the circulation pump assembly 8, i.e. between the entry and exit of the load circuits 6 is regulated to a pressure difference setpoint $H_{ref}$, which is effected in the control loop $R_4$. Moreover the pressure difference setpoint $H_{ref}$ for its part is regulated and set in the control loop $R_3$, which is effected in the manner described above in dependence on the opening degree $V_{pos,n}$ of the regulating valve 24. For this, the regulating valve 24 is with the greatest opening degree $V_{pos}$ is considered and is compared to a desired opening degree $V_{pos,ref}$. If the desired opening degree $V_{pos,ref}$ is fallen short of, then the pressure difference setpoint $H_{ref}$ is increased proportionally. If the desired opening degree $V_{pos,ref}$ is exceeded, accordingly the pressure difference setpoint $H_{ref}$ is reduced. As is likewise represented in FIG. 5, the circulation pump assembly 8 comprises a detection device 38 which estimates or determines the actual pressure difference $H_{pu}$ from the speed $S_{pu}$ and the electrical power $P_{pu}$.

The four shown control lops $R_1$, $R_2$, $R_3$, $R_4$ are differently quick and differently sluggish, so that they preferably do not interact with one another, i.e. they do not mutually influence one another. The quickest control loop is the control loop $R_4$ which regulates the pressure difference $H_{pu}$ across the circulation pump assembly 8 to the pressure difference setpoint $H_{ref}$. The next slower control loop is the control loop $R_1$ which regulates the volume flow through the individual load circuits 6. Even slower is the control loop $R_3$ which regulates the pressure difference setpoint $H_{ref}$. This control loop is so slow that this regulation preferably does not influence the control loop $R_1$. In FIG. 5 not shown are two further control loops, namely the control loop for regulating the room temperature by switching-on and switching-off the load circuit 6 as well as the control loop which regulates the feed temperature on the elected feed temperature setpoint. These two control loops are preferably designed still slower than the preceding described load circuits whereas that load circuit which sets the feed temperature is preferably the slowest load circuit.

Apart from the regulation method described above, the control device 10 can also assume further functions. It is possible to store certain priorities for the individual load circuits 6 in the control device 10, since this control device communicates with room thermostats 34 and switches on the load circuits 6 by way of opening the regulating valves 24, in dependence on the signals from the room thermostats 34. Thus, with a heating system and when very cold, it is possible for example to not simultaneously activate all load circuits 6 in the case that the heat quantity made available by the boiler would not be sufficient. For heating, firstly prioritized heating circuits such as for example living rooms or bath can be switched on, and less important load circuits 6, for example for heating bedrooms can firstly remain switched off. Thereby, the control device 10 can automatically detect that the heating power available is not sufficient, specifically when all regulating valves 34 are opened, i.e. have the maximal opening degree and despite this the temperature difference $\Delta T$ between the entry 30 and the exit 22 becomes too large. This functions in a corresponding manner also with a cooling system, but in reverse. The priority of the load circuits 6 can be preset and be stored in the control device 10. Moreover, the control device 10 can also be designed such that for heating rooms, it increases the feed temperature $T_{mix}$ for a certain time above the usually sought setpoint resulting from the previously described regulation, in order to permit a rapid heating of the rooms.

Finally, the control device 10 can also have a diagnosis function or diagnosis module which diagnoses the correct function of the regulating valves 24 as well as of the load circuits 6. Thus, the control device 10 in a diagnosis mode can individually open the regulating valves 24 of the load circuits 6 or increase or reduce the opening degree of the regulating valves 24, ideally to the maximum. Thereby, in each case only one regulating valve 24 is opened and closed further departing from an initial opening degree, whilst the other regulating valves 24 remain unchanged or closed. Preferably the regulating valve 24 of the load circuit 6 which has to be rechecked is further opened. Subsequently, the flow through the circulation pump assembly 8 as well as the differential pressure across the circulation pump assembly 8 is detected and the hydraulic resistance of the system respectively a change of the hydraulic resistance is determined from this. The control device 10 also receives information or signals from the circulation pump assembly 8 which specifies the flow and the differential pressure. The control device 10 compares the determined hydraulic resistance with a maximum hydraulic resistance with is predefined for the system and which is stored in the control device 10. If the detected hydraulic resistance exceeds the predefined maximum hydraulic resistance, this indicates an error and the control device 10 signalizes this error, so that the system can be subsequently examined. If the hydraulic resistance before and after the opening of the regulating valve 24 are compared to one another, then the correction function of the regulating valve 24 can be determined from this. Moreover, the hydraulic resistance can also be compared to a minimal value in the control device 10. If a stored minimal value is fallen short of, then likewise a malfunction can be deduced from this.

The diagnostic function described above can be also realized so that the pressure loss and hence, the hydraulic resistance is taken into account only the individual load circuits 6 or determined by the control device 10. This can also be done by knowing the characteristics of the valves lying in the flow path, especially the check valve 20 and the regulating valve 24 taking into account the known opening degree of the valves 24. If the pressure losses of the valves are known in the given operating state, then the proportion of the total pressure loss of the circulation pump 8 which is provided between input and output can be determined, which is caused by the respective load circuit 6 itself. Accordingly, the permissible limits for the pressure loss and the hydraulic resistance of the load circuit 6 itself can be parked. I.e., it will only take into account the hydraulic resistance of the load circuit in the comparison with the permissible limits, the limits are limits for the hydraulic resistance of the load circuit.

Figure 2:
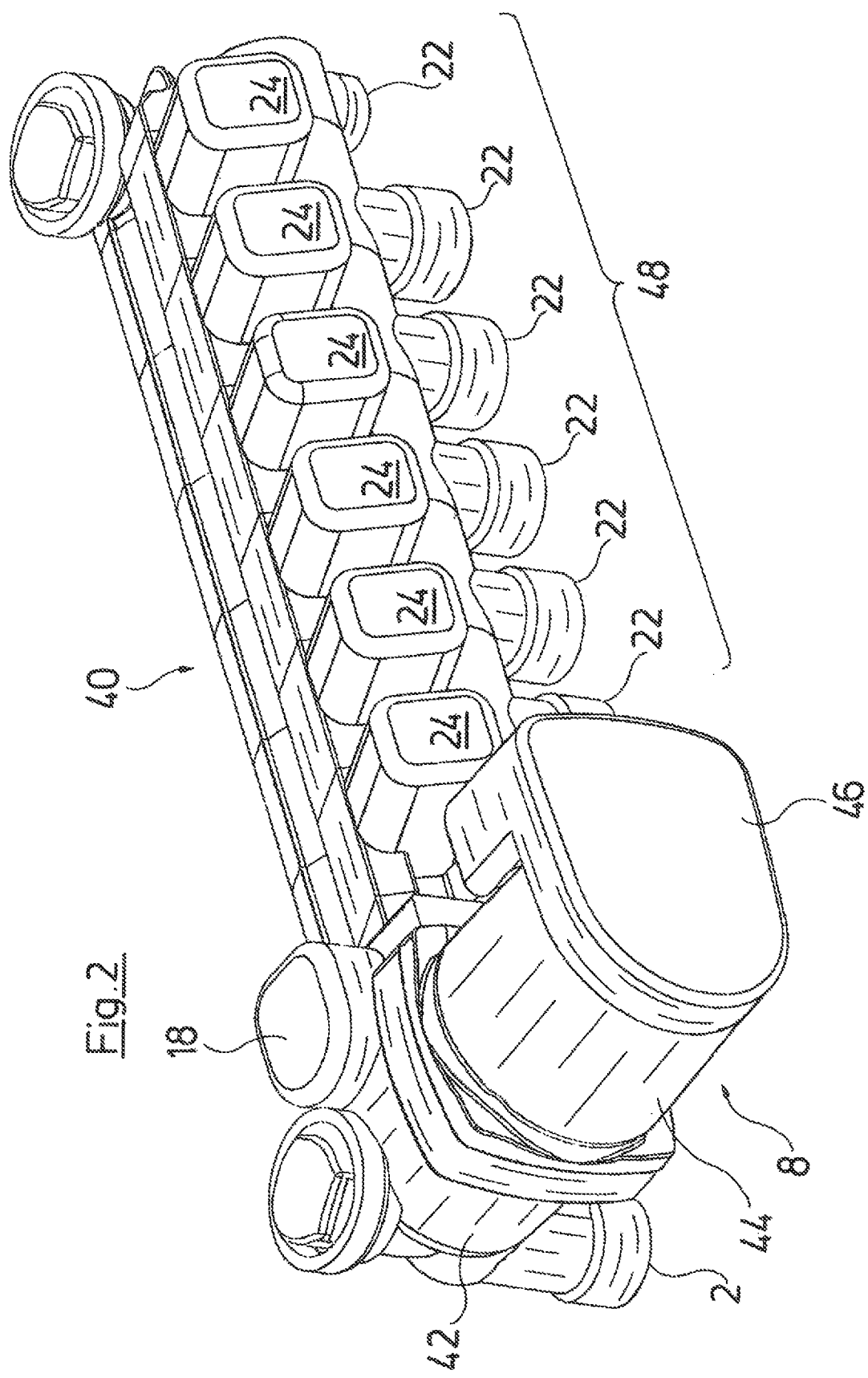
FIG. 2 is a schematic perspective view showing a manifold device according to the invention.
Figure 3:
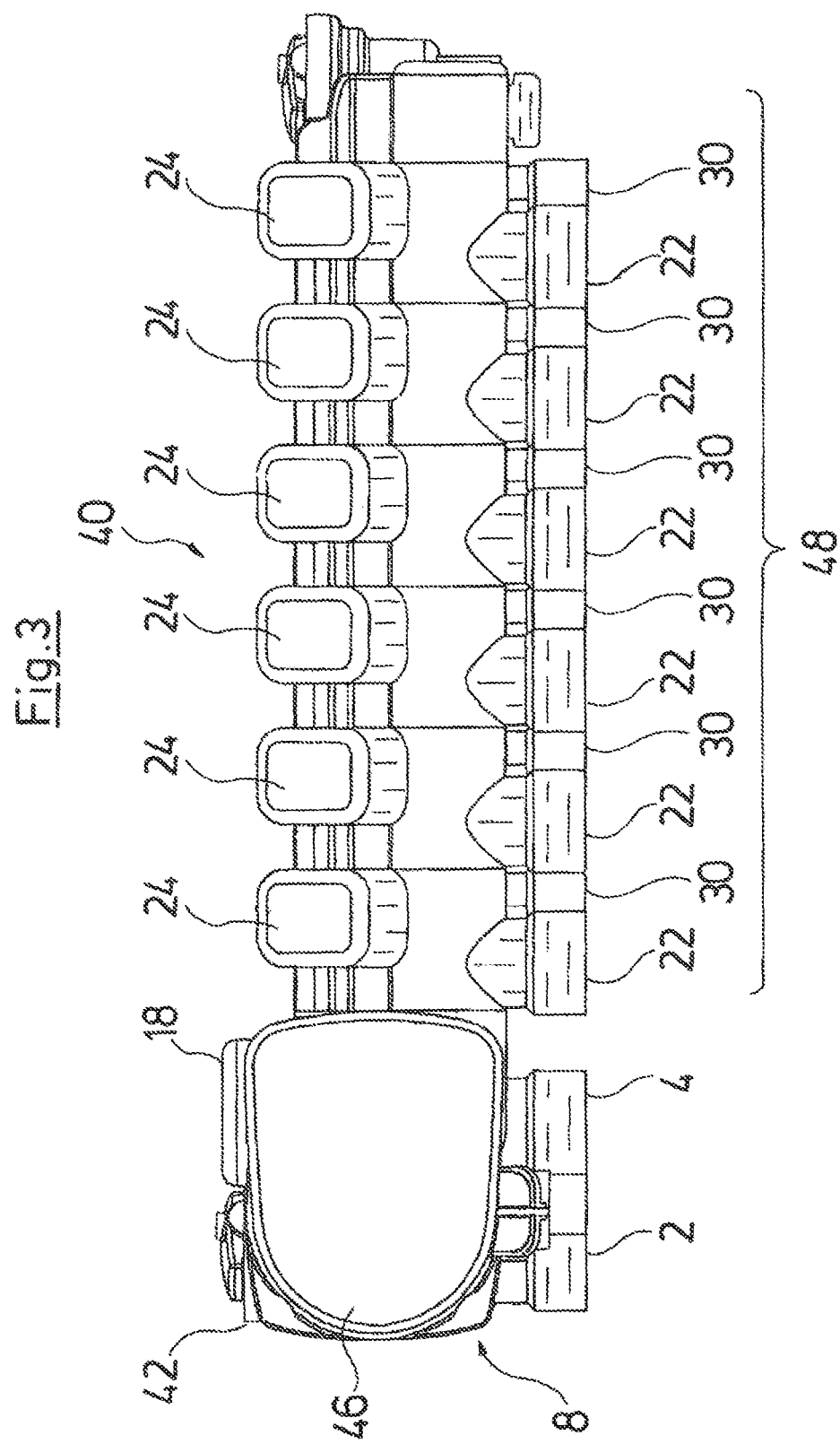
FIG. 3 is a plan view of the manifold device according to FIG. 2.

The essential components of the heating system shown in FIG. 1 are preferably integrated into a manifold device in the form of a heating manifold, as is shown in FIGS. 2 and 3. Thereby, all essential components lying within the dashed line in FIG. 1 are integrated into the manifold device in the form of a construction unit. Thus, the heating manifold 40 which is shown in FIGS. 2 and 3 as a central component comprises the circulation pump assembly 8. This comprises a pump housing 42, in which a rotatable impeller is arranged. The impeller is driven by an electric drive motor which is arranged in a motor housing or stator housing 44. A terminal box or electronics housing 46, in which the control device 10 is accommodated, is arranged on the axial end of the stator housing 44 which is away from the pump housing 42. The pump housing 42 compromises the inlet 2 as well as the outlet 4 in the form of connections of external pipe conduits. Moreover, the mixing valve 18 is arranged in the pump housing, and the mixing conduit 12 with the mixing point 16 is formed in the pump housing. The pump housing 42 is connected at one side to the actual manifold 48. The manifold 48 comprises modules 50 for the individual load circuits, in this case six load circuits 6. The regulating valves 24 as well as connections which form the entries 30 for the load circuits 6 are arranged in the modules 50. Moreover, each module 50 comprises a connection which forms the exit 22 for the respective load circuit 6. Pipe conduits which form the load circuits 6, for example pipe conduits of a floor heating are be connected to the connections forming the entries 30 and the exits 22. A feed conduit and a return conduit which are connected to the pump housing 42 are arranged in the manifold 48, wherein the return conduit is connected to the return 14 in the pump housing and the feed conduit is connected to the exit side of the circulation pump 8. The temperature sensors 26 and 28 are also integrated into the manifold 48 or the pump housing 42. Thus, preferably, only the room thermostats 34 with their radio interfaces 36 form external components of the regulation technology, which however can be easily connected by way of the radio connection to the communication interface 32 of the control device 10 which is arranged in the electronics housing 46. All other necessary electric and/or electronic components for the control and/or regulation are integrated into the heating manifold 40 as a premanufactured construction unit.

While specific embodiments of the invention have been shown and described in detail to illustrate the application of the principles of the invention, it will be understood that the invention may be embodied otherwise without departing from such principles.

The invention claimed is:

1. A diagnosis method for a diagnosis of a correct function of a heating and/or cooling system with at least one load circuit, through which a fluid flows as a heat transfer medium, the method comprising the steps of:
    changing, for the diagnosis, an opening degree of the at least one load circuit for changing the flow;
    subsequently detecting a differential pressure across the load circuit or a volume flow of a fluid flowing through the load circuit or both a differential pressure across the load circuit and a volume flow of a fluid flowing through the load circuit to provide detected values;
    comparing the detected values or comparing a value derived from the detected values to at least one predefined system limit value;
    determining whether the heating and/or cooling system is functioning properly based on the comparison of the detected values or the value derived from the detected values to the at least one predefined system limit value, wherein:
        several load circuits are present and the opening degree in each case of one of the load circuits is changed in a successive manner for diagnosis;
        simultaneously, the opening degree of further remaining load circuits remains unchanged and subsequently the differential pressure or the volume flow or both the differential pressure and the volume flow of the fluid flowing through the load circuit with an increased opening degree are detected and the detected values or a value derived from the detected values are compared to at least one predefined system limit value;
        an error notice is issued if a deviation from the at least one predefined system limit value is measured;
    the error notice indicates to a user or operator of a malfunction of the heating and/or cooling system necessitating an inspection of the heating and/or cooling system.

2. The diagnosis method according to claim 1, wherein the opening degree of the load circuit is changed in a manner such that the opening degree is increased for increasing the flow.

3. The diagnosis method according to claim 1, wherein the opening degree of the at least one load circuit is changed in a manner such that the opening degree of the at least one load circuit is reduced for reducing the flow.

4. The diagnosis method according to claim 1, wherein the differential pressure or the volume flow or both the differential pressure and the volume flow are detected by a circulation pump assembly, which delivers the fluid through the load circuit.

5. The diagnosis method according to claim 1, wherein a hydraulic resistance for an opened load circuit is determined as a derived value from the detected differential pressure or the volume flow or both the differential pressure and the volume flow.

6. The diagnosis method according to claim 5, wherein the hydraulic resistance is compared to at least one predefined system limit value for the hydraulic resistance.

7. The diagnosis method according to claim 6, wherein the hydraulic resistance is compared to a minimal or a maximal or both a minimal and a maximal system limit value.

8. The diagnosis method according to claim 1, wherein the error notice is produced on exceeding a maximal system limit value or falling short of a minimal system limit value or both exceeding a maximal system limit value and falling short of a minimal system limit value.

9. A manifold device for a heating and/or cooling system with at least one load circuit, wherein the manifold device comprises:
    at least one circulation pump assembly for delivering a fluid through at least one load circuit;
    a regulating valve for setting the volume flow through the load circuit, wherein one of the at least one circulation pump assembly and at least one sensor is configured to detect a volume flow through the at least one load circuit or a differential pressure across the load circuit or both the volume flow and the differential pressure;
    a control device which is connected to the regulating valve for actuation thereof and is connected to the detecting device, wherein the control device is configured to:
    change, for a diagnosis, an opening degree of the load circuit for changing the flow;
    subsequently detect, with the detecting device, a differential pressure across the load circuit or a volume flow of a fluid flowing through the load circuit or both the differential pressure across the load circuit and a volume flow of a fluid flowing through the load circuit to provide detected values;
    compare the detected values or compare a value derived from the detected values to at least one predefined system limit value;
    determining whether the heating and/or cooling system is functioning properly based on the comparison of the detected values or the value derived from the detected values to the at least one predefined system limit value, wherein:

several load circuits are present and the opening degree in each case of one of the load circuits is changed in a successive manner for diagnosis via the control device;

simultaneously, the opening degree of further remaining load circuits remains unchanged and subsequently the differential pressure or the volume flow or both the differential pressure and the volume flow of the fluid flowing through the load circuit with an increased opening degree are detected and the detected values or a value derived from the detected values are compared to at least one predefined system limit value;

an error notice is issued if a deviation from the at least one predefined system limit value is measured;

the error notice alerts a user or operator to inspect the heating and/or cooling system based on a malfunctioning of the heating and/or cooling system.

10. The manifold device according to claim 9, wherein regulating valves are provided in each case for setting a volume flow in one of the several load circuits, wherein the control device is configured to activate the regulating valves and is signal-connected to the regulating valves for activation thereof.

11. The manifold device according to claim 10, wherein the circulation pump assembly is situated in a common feed conduit to all load circuits.

12. The manifold device according to claim 9, wherein the circulation pump assembly functions as a detecting device and is configured to determine a differential pressure across the circulation pump assembly or a volume flow through the circulation pump assembly or both a differential pressure and a volume flow, and is signal-connected to the control device for transferring determined values.

13. The manifold device according to claim 10, wherein the circulation pump assembly functions as a detecting device and is configured to determine a differential pressure across the circulation pump assembly or a volume flow through the circulation pump assembly or both a differential pressure and a volume flow, and is signal-connected to the control device for transferring determined values.

14. The manifold device according to claim 9, wherein the control device is further configured to produce an error message upon exceeding a maximal system limit value or falling short of a minimal system limit value or both exceeding a maximal system limit value and falling short of a minimal system limit value.

15. A diagnosis method comprising:
providing at least one of a heating and cooling system comprising a load circuit, wherein fluid flows through the load circuit as a heat transfer medium;
changing an opening degree of the load circuit for changing a flow of the fluid through the load circuit;
detecting a differential pressure across the load circuit or a volume flow of a fluid flowing through the load circuit after changing the opening degree of the load circuit or detecting both a differential pressure across the load circuit and a volume flow of a fluid flowing through the load circuit to provide detected values after changing the opening degree of the load circuit;
comparing the detected values with at least one predefined system limit value or comparing a value derived from the detected values to the at least one predefined system limit value to provide at one or more compared values;
determining whether the heating and/or cooling system is functioning properly based on the one or more compared values.

16. The diagnosis method according to claim 15, wherein the opening degree of the load circuit is changed in a manner such that the opening degree is increased for increasing the flow, wherein an error notice is issued if a deviation from the at least one predefined system limit value is measured, the error notice alerting a user or operator to inspect the at least one of the heating and cooling system based on a malfunctioning of the at least one of the heating and cooling system.

17. The diagnosis method according to claim 15, wherein the opening degree of the load circuit is changed in a manner such that the opening degree of the load circuit is reduced for reducing the flow.

18. The diagnosis method according to claim 15, wherein the differential pressure or the volume flow or both the differential pressure and the volume flow are detected by a circulation pump assembly, which delivers the fluid through the load circuit.

19. The diagnosis method according to claim 15, wherein a hydraulic resistance for the opened load circuit is determined as a derived value from the detected differential pressure or the volume flow or both the differential pressure and the volume flow, wherein an error notice is issued when the heating and/or cooling system is in an improper functioning state.

20. The diagnosis method according to claim 19, wherein the hydraulic resistance is compared to at least one predefined system limit value for the hydraulic resistance.

* * * * *